(12) United States Patent
Murata et al.

(10) Patent No.: US 9,889,886 B2
(45) Date of Patent: Feb. 13, 2018

(54) SUSPENSION MEMBER

(71) Applicant: TOYOTA JIDOSHA KABUSHIKI KAISHA, Toyota-shi (JP)

(72) Inventors: Soshiro Murata, Toyota (JP); Takashi Sasaki, Miyoshi (JP)

(73) Assignee: TOYOTA JIDOSHA KABUSHIKI KAISHA, Toyota-shi (JP)

( * ) Notice: Subject to any disclaimer, the term of this patent is extended or adjusted under 35 U.S.C. 154(b) by 0 days.

(21) Appl. No.: 15/264,852

(22) Filed: Sep. 14, 2016

(65) Prior Publication Data

US 2017/0113723 A1 Apr. 27, 2017

(30) Foreign Application Priority Data

Oct. 23, 2015 (JP) ................................. 2015-209222

(51) Int. Cl.
*B62D 21/11* (2006.01)
*B62D 21/15* (2006.01)

(52) U.S. Cl.
CPC ............ *B62D 21/11* (2013.01); *B62D 21/152* (2013.01); *B62D 21/155* (2013.01)

(58) Field of Classification Search
CPC ..... B62D 21/11; B62D 21/152; B62D 21/155
See application file for complete search history.

(56) References Cited

U.S. PATENT DOCUMENTS

| | | | | |
|---|---|---|---|---|
| 6,880,663 B2* | 4/2005 | Fujiki | ................. | B62D 21/155 180/232 |
| 7,584,815 B2* | 9/2009 | Ogawa | ..................... | B60G 3/20 180/312 |
| 7,591,502 B2* | 9/2009 | Hedderly | ............... | B60J 5/0405 188/377 |
| 8,641,066 B2* | 2/2014 | Kudla | .................... | B62D 21/11 180/312 |
| 9,610,979 B2* | 4/2017 | Hirano | ................... | B62D 21/11 |
| 2006/0001228 A1* | 1/2006 | Yoshimura | ............. | B62D 21/11 280/124.109 |
| 2007/0169982 A1 | 7/2007 | Ogawa et al. | | |
| 2013/0249250 A1* | 9/2013 | Ohhama | ................ | B62D 21/11 296/204 |
| 2015/0298739 A1* | 10/2015 | Buschjohann | ......... | B62D 21/02 296/193.08 |

(Continued)

FOREIGN PATENT DOCUMENTS

JP 2005-289115 10/2005

*Primary Examiner* — Drew J Brown
(74) *Attorney, Agent, or Firm* — Oblon, McClelland, Maier & Neustadt, L.L.P.

(57) ABSTRACT

A suspension member that includes: a rear cross member having a pair of secondary side rails; a front cross member; a right and left pair of front body mounts; and a right and left pair of side rails that are each formed in a closed cross-sectional shape having a higher ductility than a ductility of the front body mounts and the secondary side rails, extend in the extension direction of the secondary side rails, and are covered from vehicle body upper side by and joined to the front body mounts in a state in which vehicle body rear side sections of the side rails are covered from their vehicle body upper side by and joined to the secondary side rails and vehicle body front side sections of the side rails overlap front end portions of the front body mounts as seen in a plan view.

7 Claims, 5 Drawing Sheets

(56) References Cited

U.S. PATENT DOCUMENTS

2016/0068193 A1\* 3/2016 Koike .................. B62D 25/082
                                              296/187.09
2016/0375938 A1   12/2016 Matsuo et al.
2017/0008565 A1\*  1/2017 Murata .................. B62D 21/11
2017/0137071 A1\*  5/2017 Kurokawa ........... B62D 27/023

\* cited by examiner

SUSPENSION MEMBER

CROSS-REFERENCE TO RELATED APPLICATION

This application is based on and claims priority under 35 USC 119 from Japanese Patent Application No. 2015-209222 filed on Oct. 23, 2015, the disclosure of which is incorporated by reference herein.

BACKGROUND

Technical Field

The present exemplary embodiments relate to a suspension member for a vehicle.

Related Art

Conventionally, suspension members have been known where right and left rear coupler portions and a rear cross member are integrally formed by die casting, right and left front coupler portions are formed by die casting, and a front cross member and right and left longitudinal members are formed by extrusion (e.g., see Japanese Patent Application Laid-open (JP-A) No. 2005-289115).

However, if the front coupler portions of the suspension member end up becoming broken by an impact load input from the vehicle body front side such as when the vehicle is involved in a frontal impact, it becomes difficult for the impact load to be transmitted to the longitudinal members (side frames), so there is the concern that the amount of energy absorbed by the longitudinal members will be reduced.

SUMMARY

Therefore, the present disclosure provides a suspension member that can efficiently absorb a load input from the vehicle body front side.

In order to achieve this object, a suspension member of a first aspect of the present disclosure includes: a rear cross member that is formed in an open cross-sectional shape whose vehicle body lower side is open, the rear cross member extending in a vehicle width direction and having a pair of secondary side rails that extend integrally from both vehicle width direction end portions of the rear cross member in a vehicle body forward direction; a front cross member that is formed in a closed cross-sectional shape and extends in the vehicle width direction; a right and left pair of front body mounts that are each formed in an open cross-sectional shape whose vehicle body lower side is open and are joined to both vehicle width direction end portions of the front cross member; and a right and left pair of side rails that are each formed in a closed cross-sectional shape having a higher ductility than that of the front body mounts and the secondary side rails, extend in the extension direction of the secondary side rails, and are covered from their vehicle body upper side by and joined to the front body mounts in a state in which their vehicle body rear side sections are covered from their vehicle body upper side by and joined to the secondary side rails and their vehicle body front side sections overlap front end portions of the front body mounts as seen in a plan view.

According to the first aspect of the present disclosure, the vehicle body front side sections of the side rails are covered from their vehicle body upper side by and joined to the front body mounts in a state in which they overlap the front end portions of the front body mounts as seen in a plan view. Additionally, the side rails are each formed in a closed cross-sectional shape having a higher ductility than that of the front body mounts and the secondary side rails. Consequently, when a load is input from the vehicle body front side to the suspension member such as when the vehicle is involved in a frontal impact, the load is efficiently absorbed by the side rails.

Furthermore, a suspension member of a second aspect of the present disclosure is the suspension member of the first aspect, wherein front end portions of the side rails are placed on the vehicle body front side of the front end portions of the front body mounts.

According to the second aspect of the present disclosure, the front end portions of the side rails are placed on the vehicle body front side of the front end portions of the front body mounts. Consequently, when a load is input from the vehicle body front side to the suspension member such as when the vehicle is involved in a frontal impact, the load is absorbed by the side rails before it is absorbed by the front body mounts. Thus, the occurrence of damage such as breakage in the front body mounts is controlled.

Furthermore, a suspension member of a third aspect of the present disclosure is the suspension member of the first or second aspect, wherein the front body mounts include ribs that are joined to side walls of the side rails.

According to the third aspect of the present disclosure, the front body mounts include the ribs that are joined to the side walls of the side rails. Consequently, the joint spots between the side rails and the front body mounts are increased compared to a configuration where the front body mounts do not include the ribs that are joined to the side walls of the side rails. Because of this, the joint strength between the side rails and the front body mounts is improved.

Furthermore, a suspension member of a fourth aspect of the present disclosure is the suspension member of any one of the first to third aspects, wherein the side rails include, on the vehicle body front side of the front body mounts, recessed bead portions along their circumferential direction, and the side rails include, on the vehicle body rear side of the front body mounts, bent portions that are bent in the vehicle body downward direction.

According to the fourth aspect of the present disclosure, the side rails include, on the vehicle body front side of the front body mounts, the recessed bead portions along their circumferential direction, and the side rails include, on the vehicle body rear side of the front body mounts, the bent portions that are bent in the vehicle body downward direction. Consequently, when a load is input from the vehicle body front side to the suspension member such as when the vehicle is involved in a frontal impact, the load is absorbed as a result of the vehicle body front sides of the side rails becoming compressively deformed in their axial direction and the load is absorbed as a result of the bent portions becoming downwardly bent and deformed. That is to say, the load is more efficiently absorbed by the side rails.

According to the first aspect of the present disclosure, a load input from the vehicle body front side can be efficiently absorbed.

According to the second aspect of the present disclosure, the occurrence of damage such as breakage in the front body mounts due to a load input from the vehicle body front side can be controlled.

According to the third aspect of the present disclosure, the joint strength between the side rails and the front body mounts can be improved.

According to the fourth aspect of the present disclosure, a load input from the vehicle body front side can be more efficiently absorbed.

BRIEF DESCRIPTION OF THE DRAWINGS

Exemplary embodiments of the present disclosure will be described in detail based on the following figures, wherein.

DETAILED DESCRIPTION

Embodiments pertaining to the present disclosure will be described in detail below on the basis of the drawings. It should be noted that, for convenience of description, arrow UP appropriately shown in the drawings indicates a vehicle body upward direction, arrow FR indicates a vehicle body forward direction, and arrow RH indicates a vehicle body rightward direction. Furthermore, when in the following description the directions of up and down, front and rear, and right and left are given without further specification, these will be understood to mean up and down in the vehicle body upward and downward direction, front and rear in the vehicle body forward and rearward direction, and right and left in the vehicle body rightward and leftward direction (vehicle width direction).

First Embodiment

Figure 1:
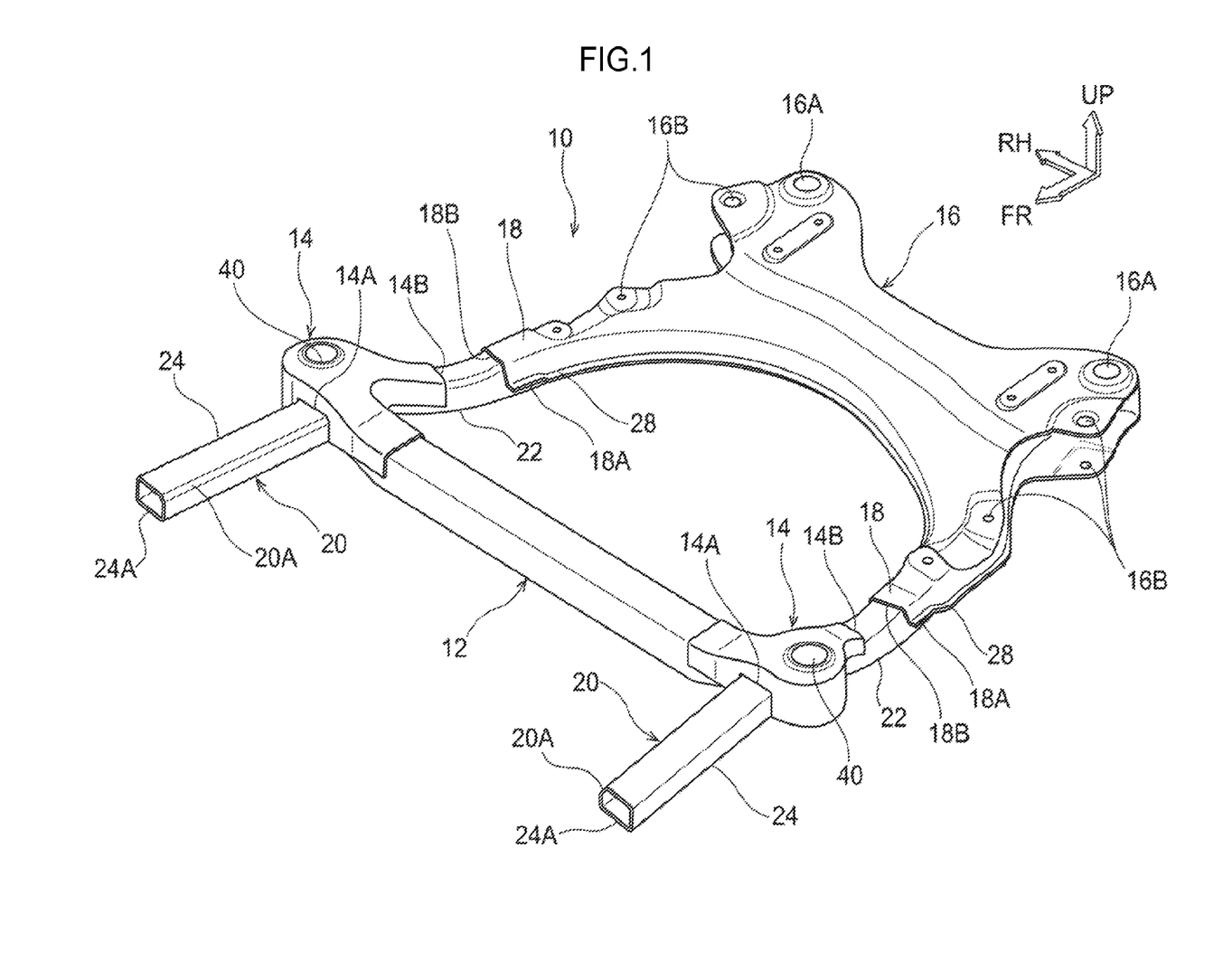
FIG. 1 is a perspective view showing a suspension member pertaining to a first embodiment.

First, a suspension member 10 pertaining to a first embodiment will be described. The suspension member 10 shown in FIG. 1 is supported on the lower side of front portions of a right and left pair of front side members (not shown in the drawings), which extend along the vehicle body forward and rearward direction, in a state in which the suspension member 10 is hung from those front side members. Here, each of the front side members has a kick portion for positioning the vehicle body front portion side in a higher position than the vehicle body rear portion side.

Consequently, a later-described right and left pair of front body mounts 14 of the suspension member 10 are attached to the front end portions of the front side members on the vehicle body front side of the kick portions, and a right and left pair of fastening portions 16A of a later-described rear cross member 16 of the suspension member 10 are attached to the lower end portions of the kick portions. An upper front bumper reinforcement (not shown in the drawings) that extends in the vehicle width direction bridges the front end portions of the right and left pair of front side members.

The suspension member 10 is equipped with: a front cross member 12 that extends in the vehicle width direction on the vehicle body front side; a right and left pair of front body mounts 14 that are joined to both vehicle width direction end portions of the front cross member 12; a rear cross member 16 that extends in the vehicle width direction on the vehicle body rear side and has a right and left pair of secondary side rails 18 that extend integrally from both vehicle width direction end portions of the rear cross member 16 in the vehicle body forward and outward direction; and a right and left pair of side rails 20 that extend in the extension direction of the secondary side rails 18, with sections (parts of later-described projecting portions 24) of the side rails 20 on the vehicle body front side of later-described bent portions 22 being joined to the front body mounts 14 and with sections (rear end portions) of the side rails 20 on the vehicle body rear side of the bent portions 22 being joined to the secondary side rails 18.

Figure 2:
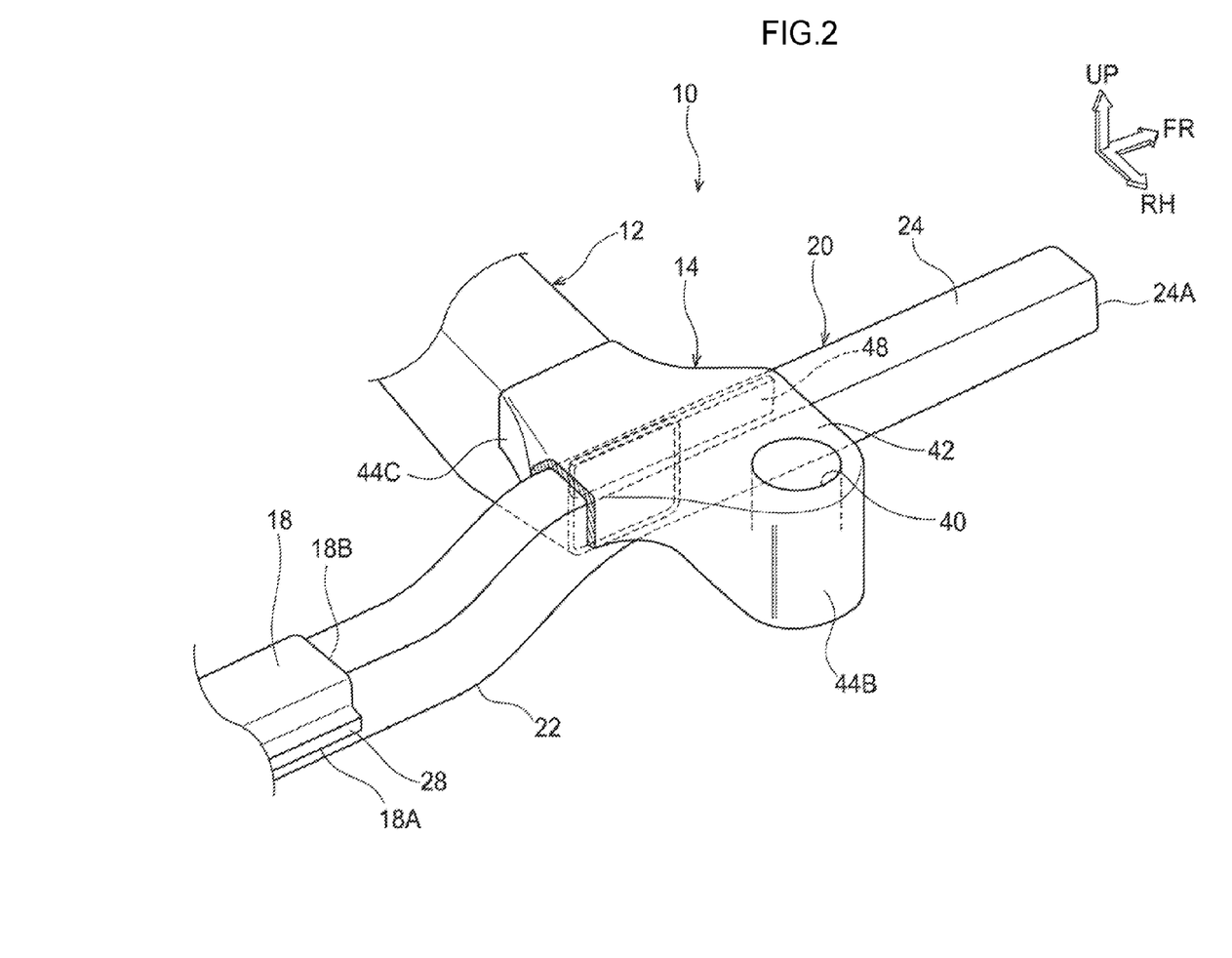
FIG. 2 is an enlarged perspective view showing main portions of the suspension member pertaining to the first embodiment.
Figure 3:
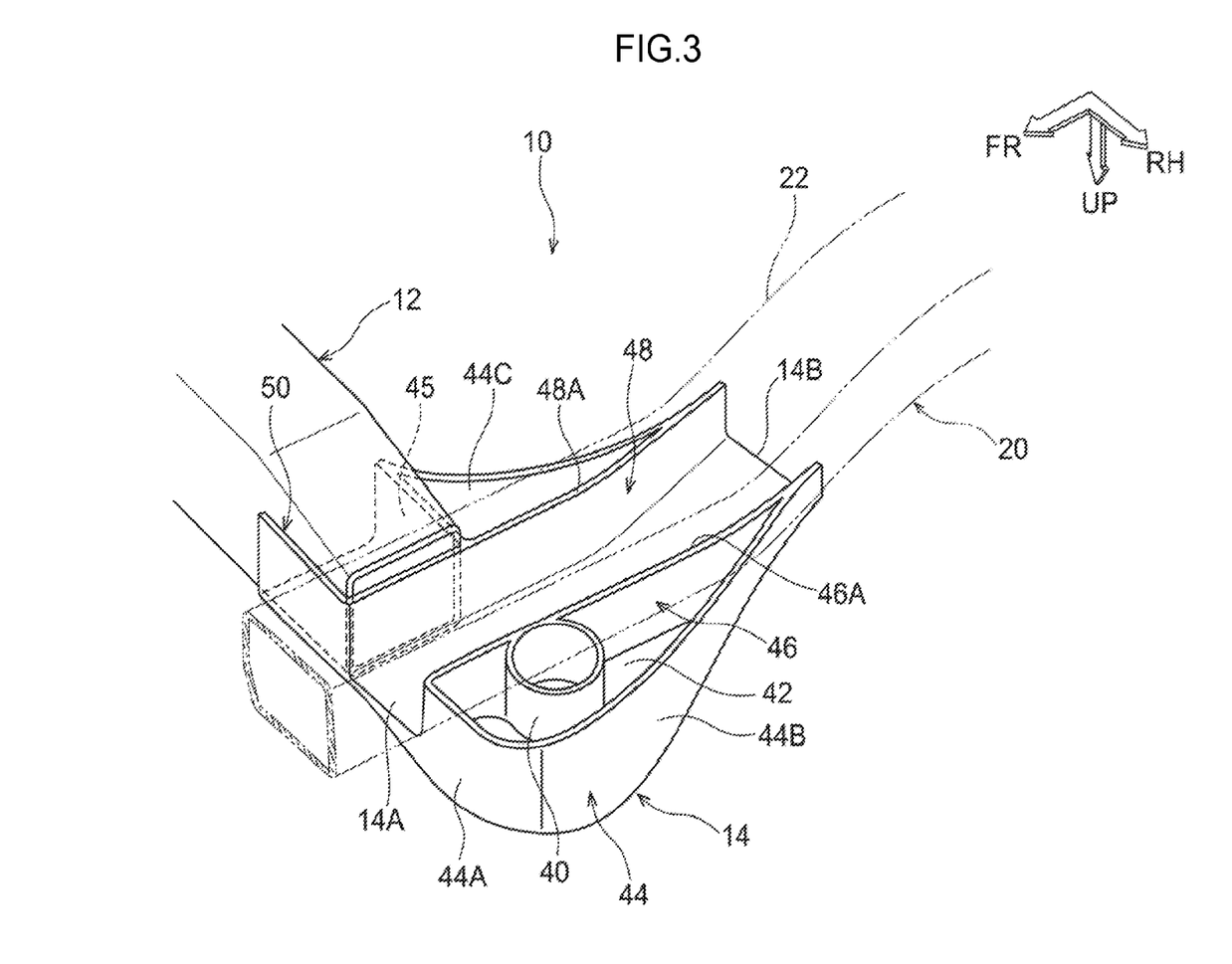
FIG. 3 is an enlarged perspective view showing an undersurface side of the main portions of the suspension member pertaining to the first embodiment.

As shown in FIG. 1 to FIG. 3, the front cross member 12 and the side rails 20 are each formed in a substantially constant rectangular closed cross-sectional shape by extruding a light metal such as an aluminum alloy, for example. Consequently, as described later, the front cross member 12 and the side rails 20 have a higher ductility compared to that of the front body mounts 14 and the rear cross member 16, which are formed by die-casting a light metal such as an aluminum alloy, for example. Because of this, the side rails 20 become plastically deformed more easily than the front body mounts 14 and the secondary side rails 18 when an impact load is input from the extension direction of the secondary side rails 18 (the vehicle body front side).

The side rails 20 include, on the vehicle body rear side of rear end portions 14B of the front body mounts 14, bent portions 22 that are bent in the vehicle body downward direction (downwardly bent) as seen in a side view seen from the vehicle width direction. The side rails 20 also include, on the vehicle body front side of front end portions 14A of the front body mounts 14, projecting portions 24 that extend in the extension direction of the secondary side rails 18.

That is, the front portion sides of the side rails 20 project a predetermined length—specifically a length where the front portion sides of the side rails 20 can function as crash boxes (impact absorbers) in the vehicle body forward direction beyond the front end portions 14A of the front body mounts 14, and those projecting parts are the projecting portions 24. An under front bumper reinforcement (not shown in the drawings) that extends in the vehicle width direction bridges front end portions 24A of the projecting portions 24. Those sections covered by the front body mounts 14 on the vehicle body front side of the bent portions 22 are also parts of the projecting portions 24.

Figure 4A:
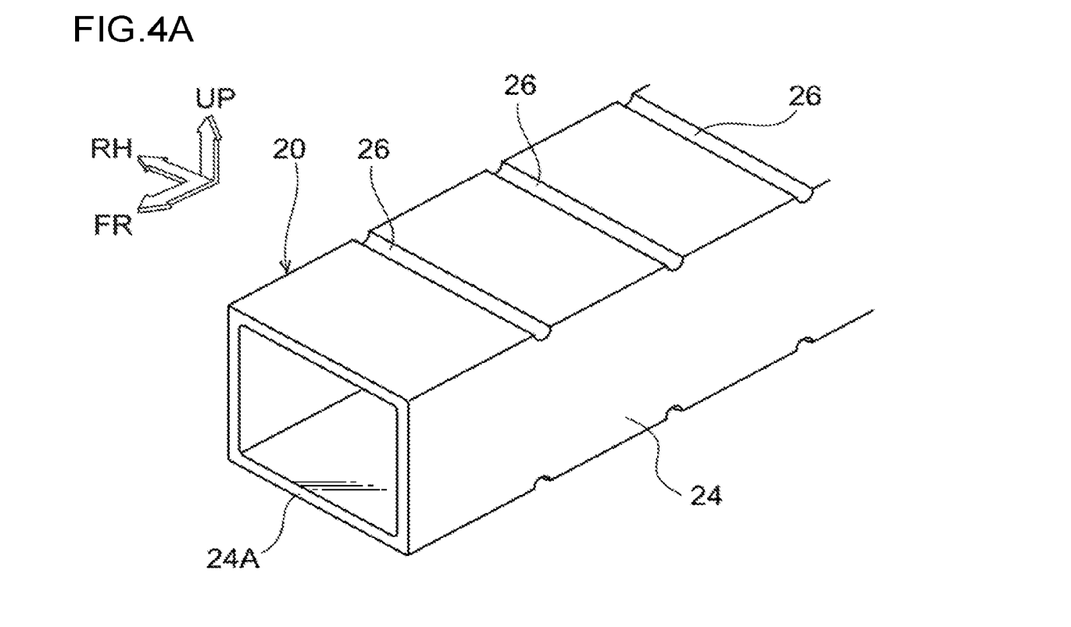
FIG. 4A and FIG. 4B are perspective views showing example modifications of side rails of the suspension member pertaining to the first embodiment.
Figure 4B:
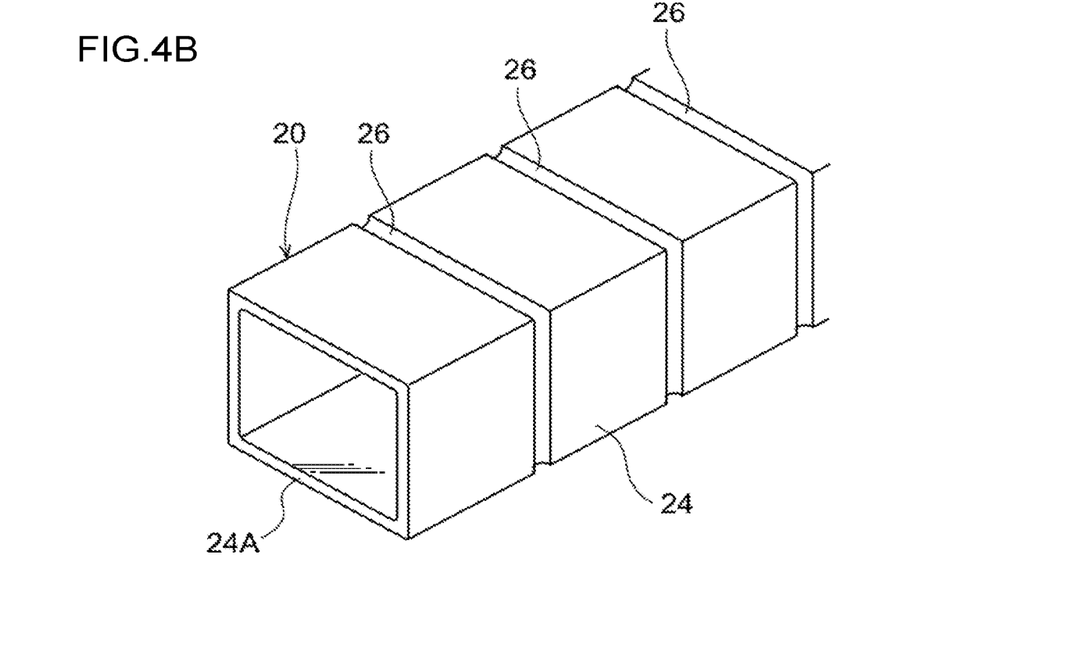

As shown in FIG. 4A, plural recessed bead portions 26 along the circumferential direction of the projecting portions 24A may be formed adjacent to each other in the vehicle body forward and rearward direction in just the upper wall and the lower wall of the projecting portions 24 that project in the vehicle body forward direction beyond the front end portions 14A of the front body mounts 14, so that compressive deformation of the projecting portions 24 in their axial direction is promoted. The recessed bead portions 26 may also be formed in just both side walls of the projecting portions 24 or, as shown in FIG. 4B, along the entire circumferential direction (the upper wall, the lower wall, and both side walls) of the projecting portions 24.

As shown in FIG. 1 to FIG. 3, the front body mounts 14 are each formed in an open cross-sectional shape whose vehicle body lower side is open by die-casting a light metal such as an aluminum alloy, for example, and the front body mounts 14 are supported on the front end portions of the front side members. The rear cross member 16 is formed in an open cross-sectional shape whose vehicle body lower side is open by die-casting a light metal such as an aluminum alloy, for example, and the secondary side rails 18 are also each formed in an open cross-sectional shape (a cross-sectionally substantially inverted U-shape) whose vehicle body lower side is open.

Consequently, the substantially upper halves (upper sides) of the rear end portions of the side rails 20 on the vehicle body rear side of the bent portions 22 are covered by the secondary side rails 18, and lower end portions 18A and front end portions 18B of the secondary side rails 18 are linearly joined by arc welding to the side walls and the upper walls of the side rails 20. Because of this, the substantially lower halves (lower sides) of the rear end portions of the side rails 20 on the vehicle body rear side of the bent portions 22 are not covered by the secondary side rails 18 but are left exposed to the outside.

The substantially upper halves (upper sides) of parts of the projecting portions 24 of the side rails 20 on the vehicle body front side of the bent portions 22 are covered by the front body mounts 14, and the lower end portions (lower end portions 46A and 48A of later-described ribs 46 and 48), the front end portions 14A, and the rear end portions 14B of the front body mounts 14 are linearly joined by arc welding to the side walls and the upper walls of the side rails 20. Because of this, the substantially lower halves (lower sides) of parts of the projecting portions 24 of the side rails 20 on the vehicle body front side of the bent portions 22 are not covered by the front body mounts 14 but are left exposed to the outside (see FIG. 3).

The substantially upper halves of both vehicle width direction end portions of the front cross member 12 are covered by the front body mounts 14, and the lower end portions (the lower end portions of later-described front walls 44A and the lower end portions of later-described connecting walls 45) and the vehicle width direction inside end portions of the front body mounts 14 are linearly joined by arc welding to the side walls and the upper wall of the front cross member 12. Because of this, the substantially lower halves (lower sides) of both vehicle width direction end portions of the front cross member 12 are not covered by the front body mounts 14 but are left exposed to the outside (see FIG. 3).

Here, the structure by which the side rails 20 and the front cross member 12 are joined to the front body mounts 14 will be described in greater detail.

As shown in FIG. 2 and FIG. 3, the front body mounts 14 each have a substantially flat plate-shaped upper wall 42 and a peripheral wall 44 that is disposed erectly from the peripheral edge portion of the upper wall 42 in the vehicle body downward direction. The peripheral wall 44 is configured to include a front wall 44A that faces the vehicle body forward direction, an outer wall 44B that faces outward in the vehicle width direction, and an inner wall 44C that faces inward in the vehicle width direction. The front end portion of the upper wall 42 and the front end portions of later-described ribs 46 and 48 at a rectangular cutout section formed in the front wall 44A serve as the front end portion 14A of the front body mount 14.

The front end portions 24A of the projecting portions 24 of the side rails 20 are placed on the vehicle body front side of the front end portions 14A of the front body mounts 14. That is, the sections (parts of the projecting portions 24) of the side rails 20 on the vehicle body front side of the bent portions 22 overlap the front end portions 14A of the front body mounts 14 as seen in a plan view, and in that state the parts of the projecting portions 24 of the side rails 20 are covered from their vehicle body upper side by and joined to the front body mounts 14.

More specifically, a pair of vertical wall-like ribs 46 and 48 that extend along the extension direction of the side rails 20 (the substantially vehicle body forward and rearward direction) are integrally disposed erectly, and opposing each other in the vehicle width direction, on the undersurface of the upper wall 42 of each of the front body mounts 14, and the distance between the ribs 46 and 48 is the same as the vehicle width direction length of each of the side rails 20. Consequently, the side rails 20 are inserted and placed between the ribs 46 and 48, and lower end portions 46A and 48A of the ribs 46 and 48 are linearly joined by arc welding to the side walls of the side rails 20.

The height of the ribs 46 and 48 is the same as the height of the peripheral wall 44, and the front end portion and the rear end portion of the rib 46 formed on the vehicle width direction outside are integrally joined to the front wall 44A and the outer wall 44B, respectively. A round tube-shaped boss portion 40 for inserting a bolt (not shown in the drawings) for attachment to the front side member is integrally formed on the upper wall 42 between the rib 46 and the outer wall 44B. Part of the outer peripheral surface of the boss portion 40 is integrally joined to the wall surface of the rib 46 that faces outward in the vehicle width direction (see FIG. 3).

The front end portion and the rear end portion of the rib 48 formed on the vehicle width direction inside are likewise integrally joined to the front wall 44A and the inner wall 44C, respectively, and the front end portion of the inner wall 44C and the rib 48 are integrally connected to each other by a connecting wall 45 disposed erectly on the undersurface of the upper wall 42 and parallel to the front wall 44A. An insertion portion 50 (see FIG. 3) for inserting the vehicle width direction outside end portion of the front cross member 12 is configured by the front wall 44A, the connecting wall 45, and the upper wall 42.

Consequently, the lower end portions of the front wall 44A and the connecting wall 45 are linearly joined by arc welding to the side walls of the vehicle width direction outside end portion of the front cross member 12 inserted into the insertion portion 50. The end surface of the vehicle width direction outside end portion of the front cross member 12 is in abutting contact with the wall surface of the rib 48 that faces inward in the vehicle width direction, and is linearly joined in a substantially U-shape by arc welding to that wall surface.

As shown in FIG. 1 and FIG. 2, the secondary side rails 18 are each formed in a cross-sectionally substantially hat shape whose plate thickness is thicker than that of the side rails 20. That is, ribs 28 that project outward in the vehicle width direction and inward in the vehicle width direction are integrally formed on the lower end portions 18A of the secondary side rails 18. Because of this, the strength and rigidity of the secondary side rails 18 are further improved.

As shown in FIG. 1, there are cases where the upper portions of the side walls on the vehicle width direction insides of the side rails 20 are configured as sloping walls 20A that slope upward and outward in the vehicle width direction (downward and inward in the vehicle width direction) as seen in a front cross-sectional view seen from the vehicle body forward and rearward direction in order to avoid interference (contact) with a later-described power unit and so forth. In this case, the lower end portions 18A of the side walls on the vehicle width direction insides of the secondary side rails 18 extend in the vehicle body downward direction to a position beyond the sloping walls.

A power unit (not shown in the drawings) including an engine and a transmission is disposed on the vehicle body front side of the suspension member 10. For that reason, an engine mount (not shown in the drawings) for supporting the power unit from below is disposed on the vehicle width direction substantially center portion of the front cross member 12 of the suspension member 10.

As shown in FIG. 1, fastening portions 16A for attachment to the lower end portions of the kick portions of the front side members are formed in both vehicle width direction end portions of the rear cross member 16. Lower arm attachment portions 16B for attaching lower arms (not shown in the drawings) configuring suspensions (not shown in the drawings) are also formed in both vehicle width direction end portions of the rear cross member 16.

Next, the operation of the suspension member 10 having the above configuration will be described.

As described above, the under front bumper reinforcement that extends in the vehicle width direction bridges the front end portions 24A of the projecting portions 24 of the side rails 20 placed on the vehicle body front side of the front end portions 14A of the front body mounts 14 (overlapping the front end portions 14A of the front body mounts 14 as seen in a plan view). Consequently, when the vehicle is involved in a frontal impact, the impact load is input from the under front bumper reinforcement (the vehicle body front side) to the side rails 20 in the axial direction of the projecting portions 24.

Here, the projecting portions 24 of the side rails 20 that project in the vehicle body forward direction beyond the front end portions 14A of the front body mounts 14 are configured to function as crash boxes (the recessed bead portions 26 along the circumferential direction of the projecting portions 24 are formed in the projecting portions 24). Consequently, when an impact load is input to the projecting portions 24 of the side rails 20 in their axial direction, the projecting portions 24 of the side rails 20 become compressively deformed in their axial direction and absorb some of the impact load that has been input.

That is to say, when the vehicle is involved in a frontal impact, some of the impact load can be absorbed by the projecting portions 24 of the side rails 20 before it is absorbed by the front body mounts 14. Consequently, the occurrence of damage such as breakage in the front body mounts 14 can be controlled. Some of the remaining impact load that was not completely absorbed by the compressive deformation of the projecting portions 24 in their axial direction is transmitted to the side rails 20 placed on the vehicle body rear side of the front end portions 14A of the front body mounts 14.

The engine mount that supports the power unit from below is disposed on the vehicle width direction substantially center portion of the front cross member 12. Consequently, when the vehicle is involved in a frontal impact, some of the impact load is also input via the power unit to the front cross member 12 of the suspension member 10.

Here, the rear cross member 16 having the secondary side rails 18 is made by die-casting a light metal such as an aluminum alloy, and the secondary side rails 18 are each formed in a cross-sectionally substantially hat shape whose plate thickness is thicker than that of the side rails 20. That is, the ribs 28 that project outward in the vehicle width direction and inward in the vehicle width direction are integrally formed on the lower end portions 18A of the secondary side rails 18, and the strength and rigidity of the secondary side rails 18 are improved.

Furthermore, the substantially lower halves of the rear end portions of the side rails 20 on the vehicle body rear side of the bent portions 22 are not covered by the secondary side rails 18 but are left exposed to the outside. For that reason, there is no concern that the bending deformation from the bent portions 22 of the side rails 20 (the absorption of energy by plastic deformation of the undersurface sides that undergo tensile deformation) will be hindered by the secondary side rails 18.

Moreover, the side rails 20 are made by extruding a light metal such as an aluminum alloy and have a higher ductility compared to that of the secondary side rails 18 of the rear cross member 16 formed by die casting. For that reason, the side rails 20 become plastically deformed more easily than the secondary side rails 18 when an impact load is input from the extension direction of the secondary side rails 18 (the vehicle body front side).

Consequently, when some of the impact load is transmitted via the projecting portions 24 and the front cross member 12 to the side rails 20 on the vehicle body rear side of the front end portions 14A of the front body mounts 14, deformation of the front end portions 18B of the secondary side rails 18 in the vehicle body upward and rearward direction is controlled, and the projecting portion 24 sides of the side rails 20 become bent and deformed from the bent portions 22 heading in the vehicle body upward and rearward direction (the bent portions 22 become downwardly bent and deformed) and absorb some of the impact load that has been transmitted.

That is to say, the side rails 20 in the present embodiment can become plastically deformed without interruption from the projecting portions 24 to the bent portions 22 regardless of whether or not damage such as breakage occurs in the front body mounts 14, and can stably and efficiently absorb some of the impact load. Thus, when the vehicle is involved in a frontal impact, the energy absorption characteristics of the suspension member 10 can be improved.

The substantially lower halves of the sections (parts of the projecting portions 24) of the side rails 20 on the vehicle body front side of the bent portions 22 are also not covered by the front body mounts 14 but are left exposed to the outside. For that reason, there is also no concern that the bending deformation from the bent portions 22 of the side rails 20 (the absorption of energy by the plastic deformation of the undersurface sides that undergo tensile deformation) will be hindered by the front body mounts 14.

Consequently, when some of the impact load is transmitted to the side rails 20 on the vehicle body rear side of the front end portions 14A of the front body mounts 14, the bending deformation from the bent portions 22 of the side rails 20 (the plastic deformation on the undersurface side) can be promoted, and some of the impact load can be more efficiently absorbed by the side rails 20.

The ribs 46 and 48 that extend in the extension direction of the side rails 20 (the substantially vehicle body forward and rearward direction) are erectly disposed on the undersurfaces of the upper walls 42 of the front body mounts 14, and the rigidity (bending rigidity) of the front body mounts 14 with respect to bending deformation in the vehicle body upward and rearward direction is improved. Consequently, deformation of the upper walls 42 of the front body mounts 14 in the vehicle body upward and rearward direction in accompaniment with the deformation of the projecting portion 24 sides of the side rails 20 in the vehicle body upward and rearward direction can be controlled. That is to say, the occurrence of damage such as breakage in the front body mounts 14 can be effectively controlled.

Furthermore, the lower end portions 46A and 48A of the ribs 46 and 48 are linearly joined to the side walls of the side rails 20, so the joint spots between the side rails 20 and the front body mounts 14 can be increased. That is to say, according to this configuration, the joint strength between the side rails 20 and the front body mounts 14 can be improved.

Furthermore, in the suspension member 10 pertaining to the present embodiment, the projecting portions 24 where the side rails 20 are elongated in the vehicle body forward direction function as crash boxes, so the number of parts can be reduced compared to a configuration where, for example, crash boxes (not shown in the drawings) are attached to the front end portions of the front body mounts 14 and the under front bumper reinforcement bridges the front end portions of the crash boxes.

Furthermore, the front body mounts 14 and the rear cross member 16 are each made by die-casting a light metal such as an aluminum alloy, so seats and bosses for attaching other parts can be easily formed in them. That is, the front body mounts 14 and the rear cross member 16 have a high rigidity and a high degree of freedom in terms of their shape, so the number of parts can be reduced. Consequently, the weight of the suspension member 10 can be reduced.

Furthermore, the front cross member 12 itself and the side rails 20 themselves are also made by extruding a light metal such as an aluminum alloy, so like the front body mounts 14 and the rear cross member 16, they have a high degree of freedom in terms of their shape. Consequently, by appropriately adjusting their shapes, they can be adapted to a variety of vehicle types and designs while sharing peripheral parts in common.

Furthermore, the side rails 20 and the secondary side rails 18 are linearly joined to each other by arc welding, so they can be strongly joined to each other, and the ingress of foreign matter between them can be controlled or prevented. Consequently, the occurrence of galvanic corrosion between them can also be controlled or prevented. The same is also true of the linear joining resulting from the arc welding of the side rails 20 and the front body mounts 14.

Furthermore, the lower arms are attached to just the rear cross member 16, so the support rigidity of the suspension member 10 with respect to the lower arms can be improved. Consequently, noise caused by vibration input from the front wheels (not shown in the drawings) and the power unit can be controlled.

Furthermore, the front body mounts 14 and the rear cross member 16 are each formed in an open cross-sectional shape whose vehicle body lower side is open, so it is easy to attach (join) them to the front cross member 12 and the side rails 20. Consequently, the process of assembling the suspension member 10 can be simplified.

Second Embodiment

Next, a suspension member 10 pertaining to a second embodiment will be described. The same reference signs will be assigned to parts that are the same as those of the suspension member 10 pertaining to the first embodiment, and detailed description of those same parts (also including shared action) will be appropriately omitted.

Figure 5:
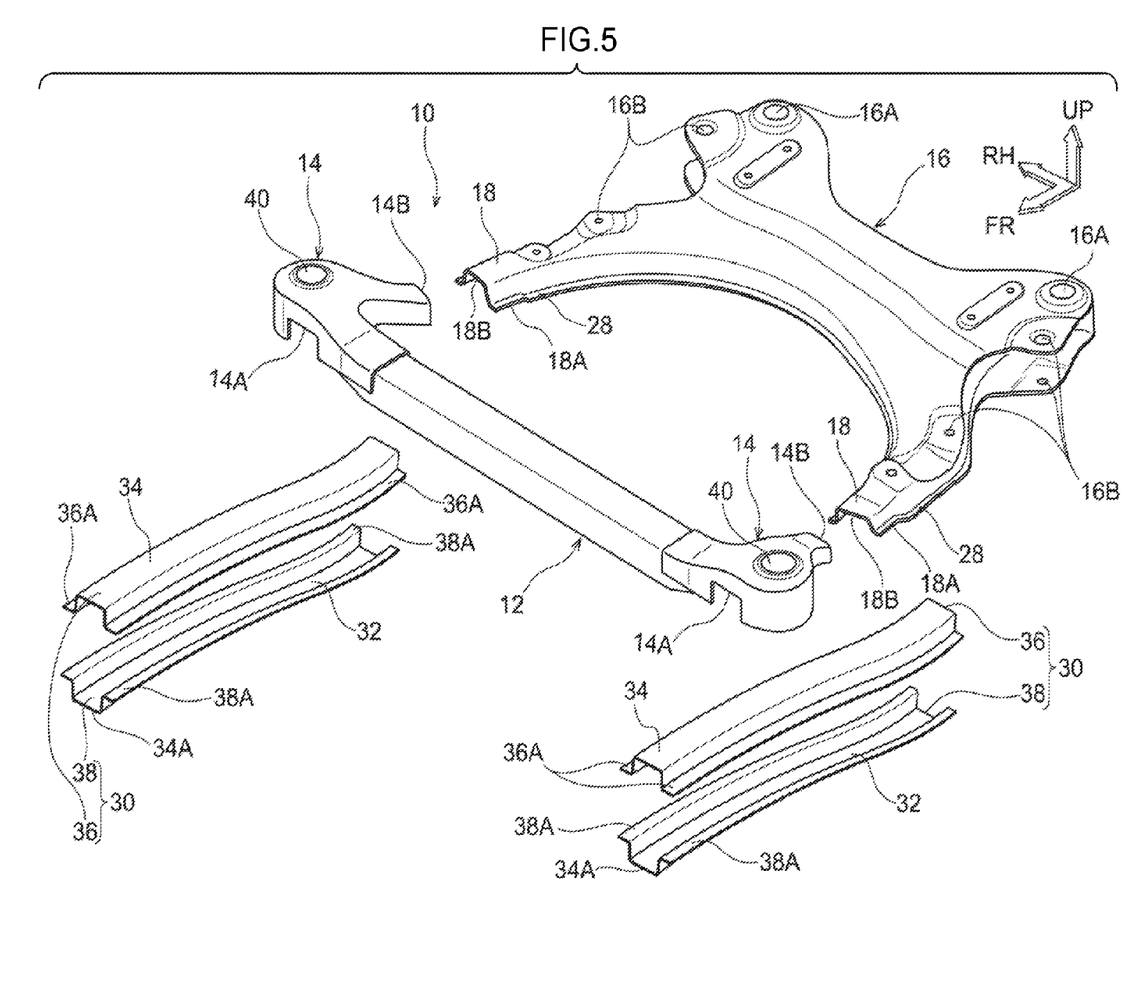
FIG. 5 is a perspective view showing a suspension member pertaining to a second embodiment.

As shown in FIG. 5, the suspension member 10 pertaining to the second embodiment differs from the suspension member 10 pertaining to the first embodiment only in that it has side rails 30 each configured by a cross-sectionally substantially hat-shaped upper panel 36 and a cross-sectionally substantially hat-shaped lower panel 38.

That is, the side rails 30 are each formed in a rectangular closed cross-sectional shape as a result of flange portions 36A of the upper panel 36 and flange portions 38A of the lower panel 38 being joined to each other by spot welding, for example. The side rails 30, like the side rails 20 in the first embodiment, each have a bent portion 32 that is downwardly bent and a projecting portion 34 to which the front body mounts 14 are joined and which projects in the vehicle body forward direction beyond the front end portions 14A of the front body mounts 14.

Consequently, when an impact load is input to front end portions 34A of the projecting portions 34 of the side rails 30 from the vehicle body front side such as when the vehicle is involved in a frontal impact, the projecting portions 34 become compressively deformed in their axial direction and can absorb some of the impact load. Additionally, the side rails 30 become bent and deformed (plastically deformed) from the bent portions 32 in such a way that the projecting portion 34 sides thereof head in the vehicle body upward and rearward direction, so that some of the remaining impact load can be absorbed. In this way, in the suspension member 10 pertaining to the second embodiment also, some of the impact load can be efficiently absorbed by the side rails 30.

The suspension member 10 pertaining to the embodiments has been described above on the basis of the drawings, but the suspension member 10 pertaining to the embodiments is not limited to what is shown in the drawings, and its design can be appropriately changed without departing from the spirit of the present disclosure. For example, the secondary side rails 18 are not limited to being formed in a cross-sectionally substantially hat shape (having the ribs 28 formed on them).

Furthermore, the lower walls of the vehicle width direction outside end portions of the front cross member 12 shown in FIG. 3 slope obliquely upward and outward in the vehicle width direction (downward and inward in the vehicle width direction) as seen in a front view seen from the vehicle body forward and rearward direction, but the front cross member 12 is not limited to this and may also be configured to have a constant cross-sectional shape as far as its vehicle width direction outside end portions.

Furthermore, the recessed bead portions 26 do not have to be formed in the projecting portions 24 of the side rails 20 provided that the projecting portions 24 are configured to be efficiently compressively deformable in their axial direction. Moreover, the welding that linearly joins the secondary side rails 18 and the front body mounts 14 to the side rails 20 is not limited to arc welding and may also be laser welding, for example.

Furthermore, it suffices for the present disclosure to include a configuration where the projecting portions 24 of the side rails 20 overlap the front end portions 14A of the front body mounts 14 as seen in a plan view. Consequently, the present disclosure also includes a configuration where the front end portions 24A of the projecting portions 24 of the side rails 20 are flush with (occupy the same position in the vehicle body forward and rearward direction as) the front end portions 14A of the front body mounts 14.

Moreover, the suspension member 10 is not limited to being made of an aluminum alloy and may also be made of a magnesium alloy, for example. Furthermore, the front body mounts 14 and the rear cross member 16 may be made of an aluminum alloy, and the front cross member 12 and the side rails 20 may be made of steel. In this case, it suffices for the front cross member 12 and the side rails 20 to be joined by rivets, for example, to the front body mounts 14 and the rear cross member 16.

What is claimed is:

1. A suspension member comprising:
   a rear cross member that is formed in an open cross-sectional shape whose vehicle body lower side is open, the rear cross member extending in a vehicle width direction and having a pair of secondary side rails that extend integrally from both vehicle width direction end portions of the rear cross member in a vehicle body forward direction;
   a front cross member that is formed in a closed cross-sectional shape and extends in the vehicle width direction;
   a right and left pair of front body mounts that are each formed in an open cross-sectional shape whose vehicle body lower side is open and are joined to both vehicle width direction end portions of the front cross member; and
   a right and left pair of side rails that are each formed in a closed cross-sectional shape having a higher ductility than a ductility of the front body mounts and the secondary side rails, extend in the extension direction of the secondary side rails, and are covered from vehicle body upper side by and joined to the front body mounts in a state in which vehicle body rear side sections of the side rails are covered from their vehicle body upper side by and joined to the secondary side rails and vehicle body front side sections of the side rails overlap front end portions of the front body mounts as seen in a plan view.

2. The suspension member according to claim 1, wherein front end portions of the side rails are placed on the vehicle body front side of the front end portions of the front body mounts.

3. The suspension member according to claim 1, wherein the front body mounts include ribs that are joined to side walls of the side rails.

4. The suspension member according to claim 1, wherein
   the side rails include, on the vehicle body front side of the front body mounts, recessed bead portions along their circumferential direction, and
   the side rails include, on the vehicle body rear side of the front body mounts, bent portions that are bent in the vehicle body downward direction.

5. The suspension member according to claim 1, wherein
   the side rails include, on the vehicle body rear side of rear end portions of the front body mounts, bent portions that are bent in the vehicle body downward direction as seen in a side view seen from the vehicle width direction, and
   the side rails include, on the vehicle body front side of the front end portions of the front body mounts, projecting portions that extend in the extension direction of the secondary side rails.

6. The suspension member according to claim 1, wherein the side rails each have a cross-sectionally substantially hat-shaped upper panel and a cross-sectionally substantially hat-shaped lower panel.

7. The suspension member according to claim 6, wherein
   the side rails include, on the vehicle body rear side of rear end portions of the front body mounts, bent portions that are bent in the vehicle body downward direction as seen in a side view seen from the vehicle width direction, and
   the side rails include, on the vehicle body front side of the front end portions of the front body mounts, projecting portions that extend in the extension direction of the secondary side rails.

* * * * *